United States Patent
Jung et al.

(10) Patent No.: US 12,362,427 B2
(45) Date of Patent: Jul. 15, 2025

(54) TERMINAL BLOCK PROTECTIVE COVER AND BATTERY MODULE INCLUDING THE SAME

(71) Applicant: SK On Co., Ltd., Seoul (KR)

(72) Inventors: Jun Hee Jung, Daejeon (KR); Jin Su Han, Daejeon (KR); Jae Il Hwang, Daejeon (KR); Min Song Kang, Daejeon (KR); Bon Seok Ku, Daejeon (KR); Sei Hoon Cho, Daejeon (KR)

(73) Assignee: SK On Co., Ltd., Seoul (KR)

( * ) Notice: Subject to any disclaimer, the term of this patent is extended or adjusted under 35 U.S.C. 154(b) by 134 days.

(21) Appl. No.: 17/486,135

(22) Filed: Sep. 27, 2021

(65) Prior Publication Data

US 2022/0102804 A1 Mar. 31, 2022

(30) Foreign Application Priority Data

Sep. 29, 2020 (KR) ........................ 10-2020-0127070

(51) Int. Cl.
| | |
|---|---|
| *H01M 50/296* | (2021.01) |
| *H01M 50/209* | (2021.01) |
| *H01M 50/262* | (2021.01) |
| *H01M 50/273* | (2021.01) |
| *H01M 50/505* | (2021.01) |

(52) U.S. Cl.
CPC ....... *H01M 50/296* (2021.01); *H01M 50/209* (2021.01); *H01M 50/262* (2021.01); *H01M 50/273* (2021.01); *H01M 50/505* (2021.01)

(58) Field of Classification Search
CPC .......................... H01M 50/293; H01M 50/543
See application file for complete search history.

(56) References Cited

U.S. PATENT DOCUMENTS

2013/0045403 A1* 2/2013 Shin .................... H01M 50/507
429/90
2013/0065097 A1* 3/2013 Hosaka ............. H01M 10/0585
429/61
(Continued)

FOREIGN PATENT DOCUMENTS

| EP | 1239506 A2 | 9/2002 |
|---|---|---|
| EP | 2612386 B1 | 11/2016 |

(Continued)

*Primary Examiner* — Maria Laios
*Assistant Examiner* — Jordan E Berresford
(74) *Attorney, Agent, or Firm* — The Webb Law Firm

(57) ABSTRACT

The battery module includes: a battery cell stack in which a plurality of battery cells are stacked; a terminal block electrically connected to the battery cell stack; a housing accommodating the battery cell stack in a form of an opened side surface on which the terminal block is formed; an insulating cover covering an opening of the housing, a terminal block through hole exposing the terminal block to the outside being formed on one side of the insulating cover; and a terminal block protective cover accommodating the terminal block exposed to the outside. A portion of the terminal block protective cover being melted in a situation of a certain temperature or higher to cover and insulate an outer surface of the terminal block, thereby insulating the terminal block and preventing the short circuit in a thermal runaway situation.

10 Claims, 10 Drawing Sheets

(56) References Cited

U.S. PATENT DOCUMENTS

| | | | | |
|---|---|---|---|---|
| 2014/0147721 A1* | 5/2014 | Kurahashi | ........... | H01M 50/571 |
| | | | | 429/121 |
| 2015/0064514 A1* | 3/2015 | Wu | .................... | H01M 50/293 |
| | | | | 429/120 |
| 2018/0175342 A1* | 6/2018 | Kim | .................... | H01M 10/045 |
| 2020/0176727 A1 | 6/2020 | Nakamoto et al. | | |

FOREIGN PATENT DOCUMENTS

| | | | |
|---|---|---|---|
| EP | 3629395 A1 | | 4/2020 |
| KR | 1020160107583 A | | 9/2016 |
| KR | 20210072513 A | * | 9/2019 |

* cited by examiner

TERMINAL BLOCK PROTECTIVE COVER AND BATTERY MODULE INCLUDING THE SAME

CROSS-REFERENCE TO RELATED APPLICATION

This application claims priority to Korean Patent Application No. 10-2020-0127070 filed Sep. 29, 2020, the disclosure of which is hereby incorporated by reference in its entirety.

BACKGROUND OF THE INVENTION

Field of the Invention

The following disclosure relates to a terminal block protective cover and a battery module including the same, and more particularly, to a terminal block protective cover capable of preventing a short circuit in a thermal runaway situation and a battery module including the same.

Description of Related

Among secondary batteries, in a battery pack used in a battery vehicle, one or more battery modules is constituted by connecting a plurality of battery cells in series or in parallel to obtain high output as illustrated in FIG. 1, and the respective battery modules are electrically connected through a bus bar. A pair of terminal blocks having different poles is provided in the battery module, and both ends of the bus bar are respectively connected to terminal blocks of different battery modules, so that the respective battery modules are electrically connected. At this time, since the terminal block and both ends of the bus bar are exposed to the outside and there is a risk of electric shock, the terminal block portion of the battery module is provided in a structure for preventing a touch by additionally mounting a terminal block protective cover made of a plastic material.

When a temperature of the battery pack increases due to internal or external causes of the battery pack, the increase in temperature causes an increase in current, a thermal runaway, which is a chain reaction in which the increase in current causes the increase in temperature of the battery pack again, may occur, and in a thermal runaway situation, the temperature of the battery pack becomes high enough to approach 600 degrees Celsius. At this time, metals inside the battery pack are affected by a high-temperature environment to generate metal particles, and the generated metal particles are sprayed in all directions inside the battery pack. On the other hand, the terminal block protective cover made of the plastic material is also burned and melted in the high-temperature environment, so that contact portions between both ends of the bus bar and the terminal block are exposed to the outside, and when the metal particles are introduced into the exposed contact portions, a short may occur, which may cause a short circuit and a fire.

Therefore, it is necessary to develop a terminal block protective cover and a battery module that can protect the contact portion between the terminal block and the bus bar even in the thermal runaway situation.

RELATED ART DOCUMENT

Patent Document (Patent Document 1) Korea Patent Laid-Open Publication No. 10-2016-0107583 ("cell cover for secondary battery and battery module including the same")

SUMMARY OF THE INVENTION

An embodiment of the present disclosure is to provide a terminal block protective cover and a battery module capable of preventing a short circuit phenomenon by protecting a contact portion between a terminal block and a bus bar in a thermal runaway situation.

Further, an embodiment of the present disclosure is to provide a terminal block protective cover and battery module capable of suppressing exposure of a bus bar to the outside in a thermal runaway situation.

Further, an embodiment of the present disclosure is to provide a battery module having a structure in which a terminal block protective cover is more easily mounted.

Further, an embodiment of the present disclosure is to provide a battery module having a structure capable of insulating a fastening portion of an end plate.

Meanwhile, an object of the present disclosure is not limited to the above-mentioned objects. That is, other objects that are not mentioned may be obviously understood from the following specification.

In one general aspect, a battery module includes: a battery cell stack in which a plurality of battery cells are stacked; a terminal block electrically connected to the battery cell stack; a housing accommodating the battery cell stack; an insulating cover covering an opening of the housing and having a terminal block through hole exposing the terminal block to an outside and being formed on one side of the insulating cover; and a terminal block protective cover accommodating the terminal block exposed to the outside, the terminal block protective cover being melted at a predetermined temperature and insulating the terminal block by covering the terminal block.

The terminal block protective cover may include a coupling protrusion extending in one direction, a coupling slot may be formed in the insulating cover, and the coupling protrusion may be coupled to the coupling slot by sliding on the coupling slot.

The insulating cover may further include shielding plates formed on one side and the other side of the terminal block exposed to the outside through the terminal block through hole.

The terminal block protective cover may further include a melting portion accommodated in the shielding plates and a detachable protrusion protruding outwardly from one side of the melting portion, and the shielding plates further comprising a detachable hole into which the detachable protrusion is inserted.

The battery module may further include a protective cover coupled to the outside of the insulating cover, the protective cover being formed with a cut-out hole to expose the terminal block to the outside through the cut-out hole at the time of coupling and being formed with a bolt hole for inserting a bolt for coupling with the insulating cover, wherein the terminal block protective cover includes: a terminal block protective portion accommodating the terminal block, and a bolt hole cover portion extending from the terminal block protective portion and covering an upper end of the bolt hole.

A bolt insulating member inserted into the bolt hole, made of an insulating material, and surrounding an outer periphery of a bolt inserted into the bolt hole may be inserted into the protective cover.

The terminal block protective cover may include an outer shape portion accommodating the terminal block, and a melting portion protruding from a surface of the outer shape portion opposite to an upper surface of the terminal block, and the melting portion may be melted at a first temperature, and the outer shape portion may be melted at a second temperature, which is a temperature higher than the first temperature.

The outer shape portion and the melting portion may be made of different materials.

The melting portion may have a thickness thinner than a thickness of the outer shape portion.

In another general aspect, a battery pack including a terminal block protective cover includes: a plurality of battery modules; and a bus bar having both ends and electrically connecting the battery modules by connecting the both ends to terminal blocks of the battery modules.

DESCRIPTION OF THE INVENTION

Figure 1:
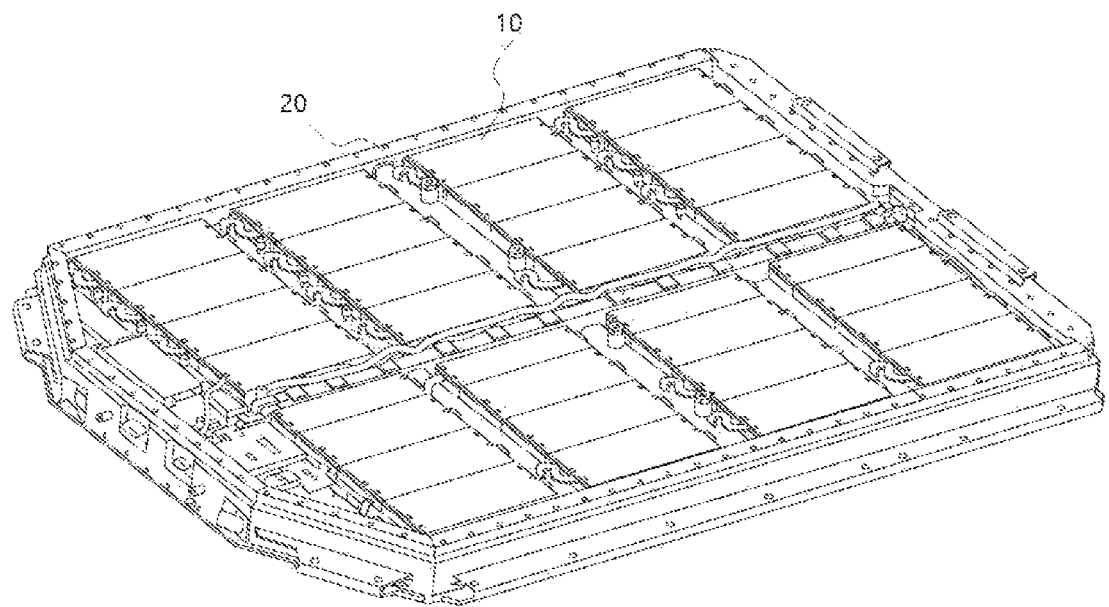
FIG. 1 is a perspective view illustrating a state in which the conventional battery modules are connected to each other through a bus bar.

Prior to describing the technical spirit of the present disclosure in more detail using the accompanying drawings, the terms or words used in the present specification and claims should not be construed as being limited to conventional or dictionary meanings, and should be interpreted as a meaning and concept consistent with the technical spirit of the present disclosure based on the principle that the inventor may appropriately define the concept of a term in order to explain the disclosure in the best way.

Therefore, since the embodiments described in the present specification and the configurations shown in the drawings are only the most preferred embodiment of the present disclosure and do not represent all of the technical spirits of the present disclosure, it should be understood that there may be various modifications that may be substituted for them at the time of filing of the present application.

Hereinafter, a technical spirit of the present disclosure will be described in more detail with reference to the accompanying drawings. The accompanying drawings are only examples shown to describe the technical spirit of the present disclosure in more detail, and therefore, the technical spirit of the present disclosure is not limited to the form of the accompanying drawings.

Figure 2:
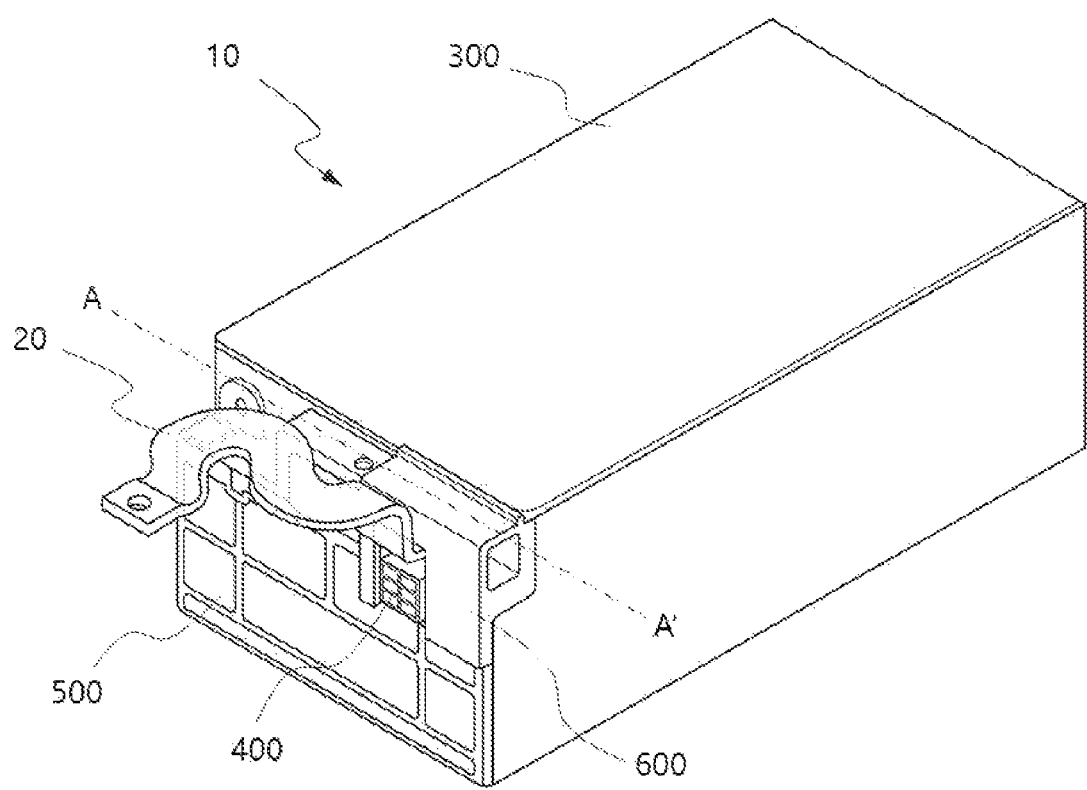
FIG. 2 is a perspective view of a battery module according to an embodiment of the present disclosure.

FIG. 2 is a perspective view of a battery module including a terminal block protective cover according to an embodiment of the present disclosure. A battery pack including a terminal block protective cover according to an embodiment of the present disclosure includes a structure in which a plurality of battery modules 10 are accommodated in a battery pack case, and the battery modules 10 disposed to be adjacent to each other are electrically connected to each other by connecting one end of a bus bar 20 to a terminal block provided on each battery module 10, as illustrated in FIG. 2. The battery module 10 including the terminal block protective cover according to an embodiment of the present disclosure mainly includes a battery cell stack, a bus bar frame 100, a terminal block 200, a housing 300, an insulating cover 400, a protective cover 500, and a terminal block protective cover 600.

Figure 3:
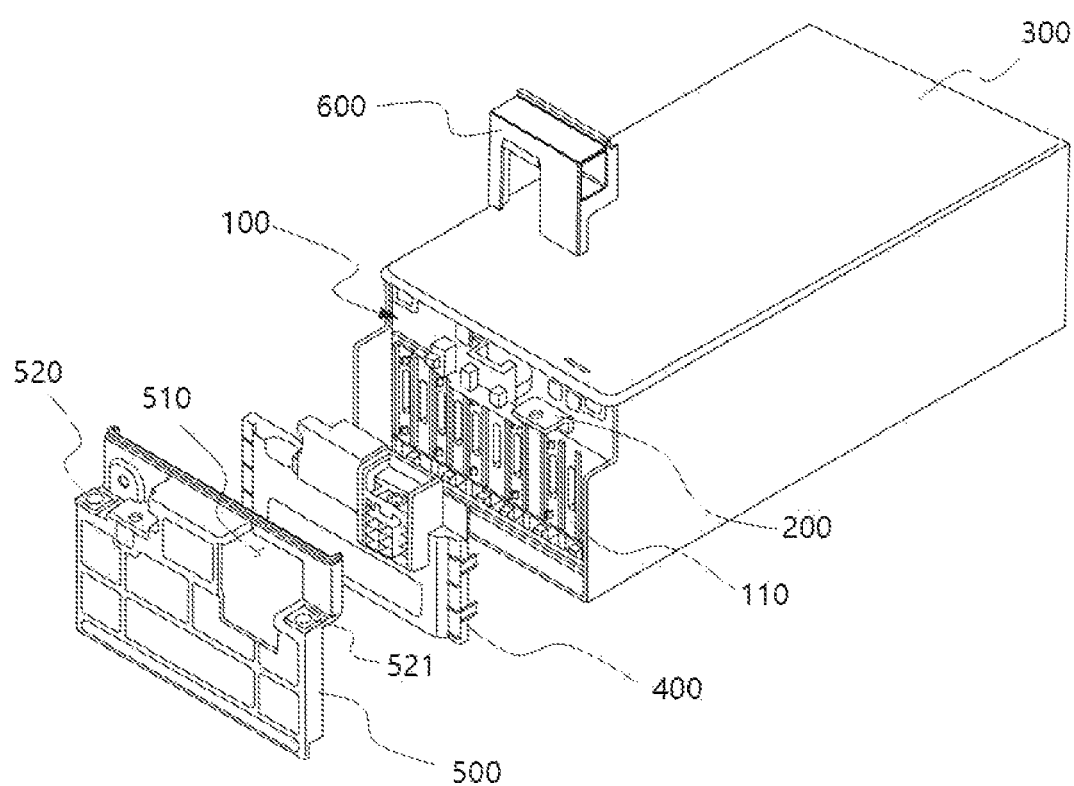
FIG. 3 is an exploded perspective view of the battery module according to an embodiment of the present disclosure.

FIG. 3 is an exploded perspective view of the battery module including a terminal block protective cover according to an embodiment of the present disclosure. A detailed configuration of the battery module 10 including a terminal block protective cover according to an embodiment of the present disclosure will be described with reference to FIG. 3.

The battery cell stack has a structure in which a plurality of battery cells are mutually stacked in one direction so that the plurality of battery cells may be electrically connected to each other. In this case, the battery cell may be formed of a pouch-type secondary battery. The battery cell may include an electrode assembly, a battery case, and an electrode lead 110. Here, the electrode assembly may include a cathode plate, an anode plate, and a separator. A pair of electrode leads 110 may be provided in one battery cell, and may be electrically connected to the electrode assembly.

The bus bar frame 100 serves to electrically connect the electrode leads 110 provided in the plurality of battery cells. A pair of bus bar frames 100 is provided, and each of the bus bar frames 100 is coupled to cover one side and the other side of the battery cell stack.

The terminal block 200 is provided on one side of the bus bar frame 100. The terminal block 200 is electrically connected to the battery cell stack through at least one of the electrode leads 110. The terminal block 200 is formed of a copper or aluminum material.

The housing 300 has a rigidity of a certain level or more. The housing 300 is formed to surround an outer surface of the battery cell stack to which the bus bar frame 100 is coupled except for both sides to which the bus bar frame 100 is coupled, so that the battery cell stack is accommodated.

The insulating cover 400 is formed to cover the outside of the bus bar frame 100. The insulating cover 400 is made of an insulating material, for example, a plastic material to insulate the outside of the bus bar frame 100. At this time, a terminal block through hole 401 exposing the terminal block 200 to the outside is formed on one side of the insulating cover 400.

Figure 4:
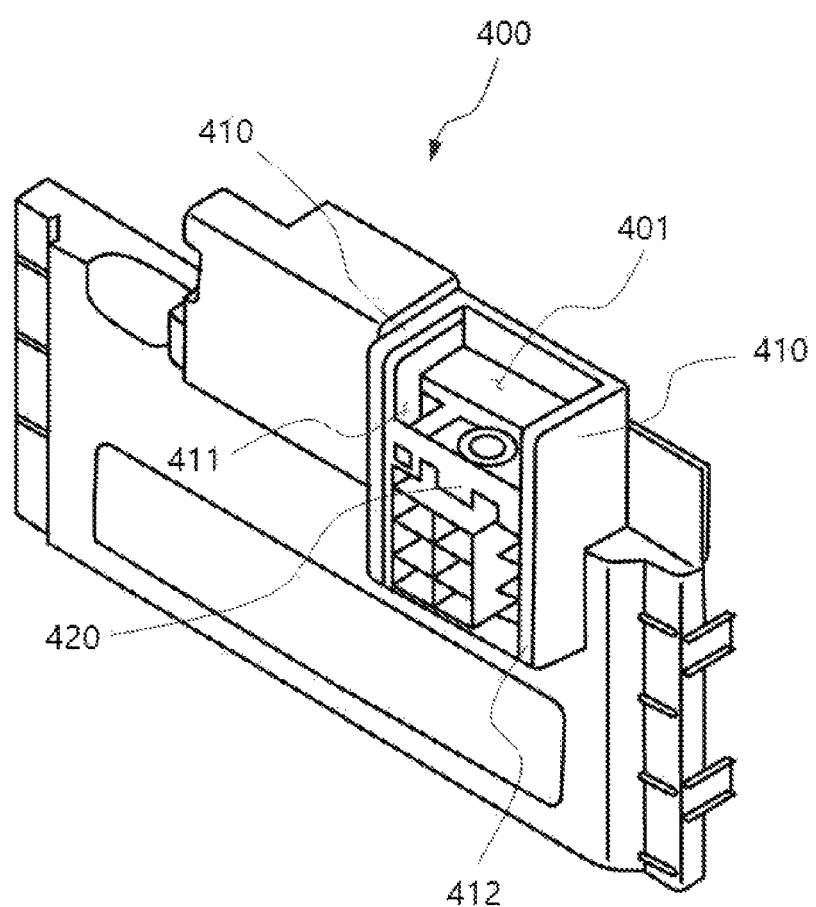
FIG. 4 is a perspective view of an insulating cover according to an embodiment of the present disclosure.

It will be described in more detail through a perspective view of the insulating cover of FIG. 4. The insulating cover 400 is further provided with shielding plates 410 on both sides of the terminal block through hole 401. That is, the terminal block 200 exposed to the outside through the terminal block through hole 401 is accommodated in a pair of shielding plates 410 and serves to primarily prevent metal particles that may occur in a thermal runaway situation from being introduced into the terminal block 200. In this case, the shielding plates 410 are preferably formed to be sufficiently longer in a vertical direction than a range in which the terminal block 200 is exposed. The shielding plates 410 may be further formed with a detachable hole 411 that is in contact with the terminal block through hole 401 and formed to be connected to the terminal block through hole 401. The detachable hole 411 is a configuration into which a detachable protrusion 616 of a terminal block protective cover 600 to be described later is inserted. A description thereof will be provided later in more detail when describing a shape of the terminal block protective cover.

In addition, the shielding plates 410 may be formed with a coupling slot 412 elongated in a vertical direction along a front end surface of the shielding plates 410 and a coupling slot 412 along an upper surface of the shielding plates 410. The coupling slot 412 is configured to enable sliding coupling of the terminal block protective cover 600 to be described later. The coupling slot 412 is configured to more firmly cover the terminal block when the terminal block protective cover 600 is coupled. The coupling slot 412 may also be formed in a section between the pair of shielding plates 410 among the upper surfaces of the insulating cover 400. The coupling slots 412 formed on each of the shielding plates 410 and the upper surface of the insulating cover 400 may be formed to be in contact with each other and connected to each other.

In the section between the shielding plates 410, a support 420 formed parallel to the terminal block is further formed below the terminal block 200 to connect the pair of shielding plates 410 to each other. The support 420 serves to maintain a constant distance between the two shielding plates 410 and to supplement a mechanical rigidity of the shielding plates 410. For effective insulation, the support 420 may be preferably formed to be in contact with a lower surface of the terminal block 200.

Figure 5:
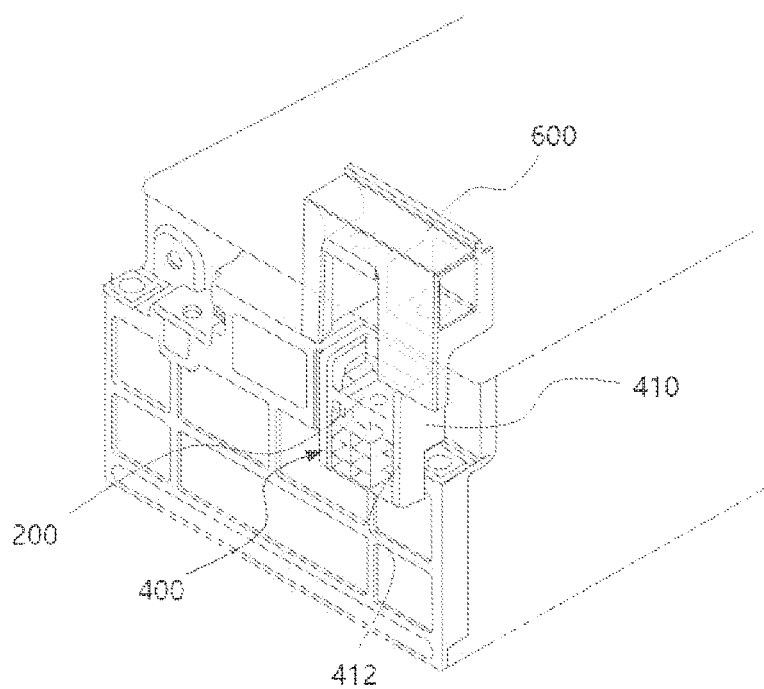
FIG. 5 is an assembly view of the battery module according to an embodiment of the present disclosure.

FIG. 5 is an assembly view of the battery module including the terminal block protective cover according to an embodiment of the present disclosure.

As illustrated in FIGS. 3 and 5, the protective cover 500 is configured to be coupled to the outside of the insulating cover 400 to provide a rigidity of a certain level or more to the outside of the insulating cover 400. Such a protective cover 500 is made of an aluminum material in order to provide a rigidity of a certain level or more. A cut-out hole 510 is formed on one side of the protective cover 500. The pair of shielding plates 410 formed on the insulating cover 400 and the terminal block 200 are exposed to the outside of the protective cover 500 through the cut-out hole 510.

Meanwhile, the protective cover 500 is provided with at least one pair of bolt holes 520. A separately provided bolt penetrates through the bolt hole 520 and is fastened to a fastening portion (not illustrated) provided on one side of the housing to fix the protective cover. In this case, the bolt hole 520 may be further provided with a bolt insulating member 521 made of an insulating material and inserted into the bolt hole 520 to surround an outer periphery of the bolt and an upper surface of the bolt hole 520 in a predetermined section. This is to prevent current from flowing to the protective cover 500 by insulating the bolt and the protective cover 500 from each other when the bolt made of a metal material is in contact with and electrically connected to the bus bar frame, terminal block, electrode lead, and the like in a process of fastening.

Figure 6:
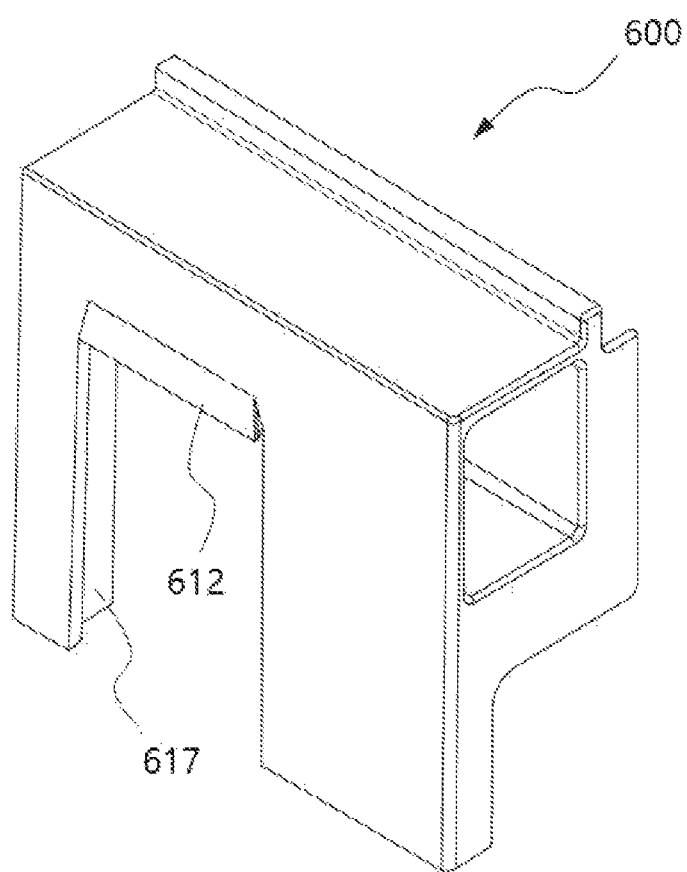
FIG. 6 is a perspective view of a terminal block protective cover according to an embodiment of the present disclosure.
Figure 8:
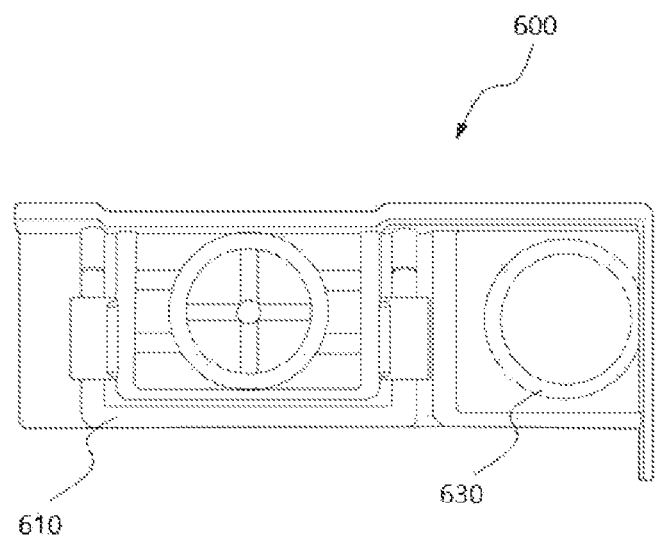
FIG. 8 is a bottom view of the terminal block protective cover according to an embodiment of the present disclosure.

FIG. 6 is a perspective view of a terminal block protective cover according to an embodiment of the present disclosure, FIG. is a rear bottom perspective view of the terminal block protective cover according to an embodiment of the present disclosure, and FIG. 8 is a bottom view of the terminal block protective cover according to an embodiment of the present disclosure.

As illustrated in FIGS. 5 to 8, the terminal block protective cover 600 is coupled to the insulating cover 400 exposed to the outside through the cut-out hole 510 to accommodate the terminal block 200. The terminal block protective cover 600 is made of an insulating material having high temperature and heat resistance, and may be made of, for example, ethylene propylene diene monomer (EPDM), MICA, glass tape, glass wool, aerogel, urethane, or thermo plastic elastomer (TPE). The terminal block protective cover 600 is most preferably made of a TPE material. The terminal block protective cover 600 is melted in a situation of a certain temperature or higher to cover and insulate the outer surface of the terminal block.

A shape of the terminal block protective cover 600 will be described in more detail. The terminal block protective cover 600 is generally divided into a terminal block protective portion 610 accommodating the terminal block 200, and a bolt hole cover portion 630 extending from the terminal block protective portion 610 and covering an upper end of the bolt hole 520 located on the side closest to the terminal block 200.

First, the terminal block protective portion 610 will be described. The terminal block protective portion 610 includes an outer shape portion 611, a coupling protrusion 617, and a melting portion 613 formed of a rib and melted at a certain temperature or higher.

The outer shape portion 611 forms the outermost side of the terminal block protective portion 610 while at the same time secondarily preventing metal particles, which may occur in a thermal runaway situation, from being introduced into the terminal block 200. The outer shape portion 611 formed to accommodate the terminal block is formed in a bucket shape in which an opening is disposed to face downward. When the outer shape portion 611 is coupled to the insulating cover 400, a lower end portion thereof is accommodated in the coupling slot 412 formed on the upper surfaces of the two shielding plates 410 of the insulating cover 400. At this time, it is preferable that the lower end of the outer shape portion 611 is formed to correspond to the coupling slot 412 so as to be fitted into the coupling slot 412. A rear side surface of the lower end of the outer shape portion 611, that is, a surface on a side disposed to face an outer side surface of the insulating cover 400, is accommodated in the coupling slot 412 formed in the section between the pair of shielding plates 410 among the upper surfaces of the insulating cover 400.

On the other hand, a surface on the front side of the outer shape portion is formed to extend by a predetermined length downward without a separate coupling element to at least partially close the section between the shielding plates 410. Here, a lower end of the surface on the front side of the outer shape portion is located above the terminal block 200, so that a predetermined gap is formed between the lower end of the surface on the front side of the outer shape portion and the support 420. The gap is a gap for the other end of the bus bar connected to the terminal block 200 to be exposed to the outside of the terminal block protective cover 600, but in a thermal runaway situation, there is a concern that the occurred metal particles may be introduced into the terminal block 200 through the gap.

In order to prevent such a problem, a guide plate 612 as illustrated in FIG. 6 is additionally formed at an end portion on the front side of the outer shape portion. The guide plate 612 is formed to externally extend from the end portion of the front side of the outer shape portion to be inclined downward, and serves to guide the bus bar exposed through the gap downward and at the same time cover the gap. An angle of the guide plate 612 is formed from 10 degrees to 50 degrees, preferably from 10 degrees to 45 degrees, and most preferably from 10 degrees to 30 degrees with respect to the front surface of the outer shape portion.

Figure 9:
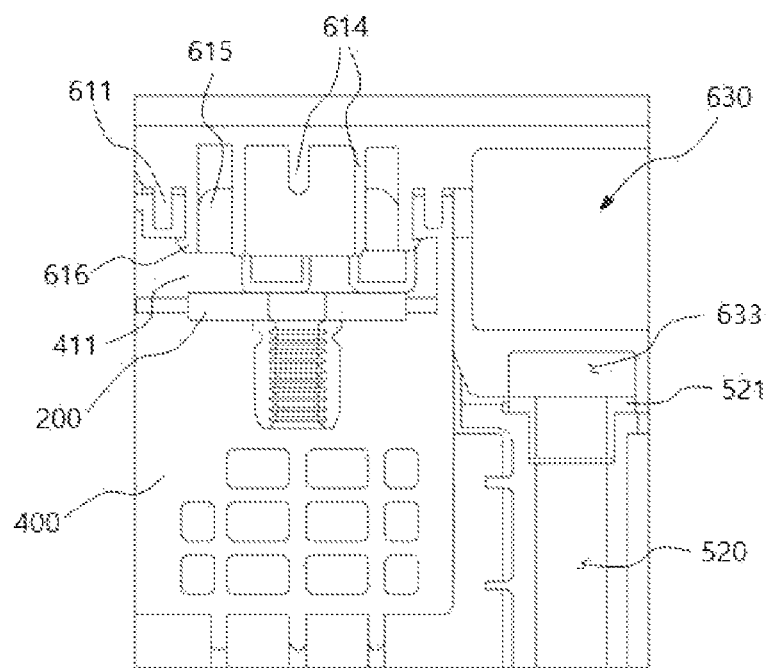
FIG. 9 is a cross-sectional view taken along line A-A' of FIG. 2.

FIG. 9 is a cross-sectional view taken along line A-A' of FIG. 2.

Figure 7:
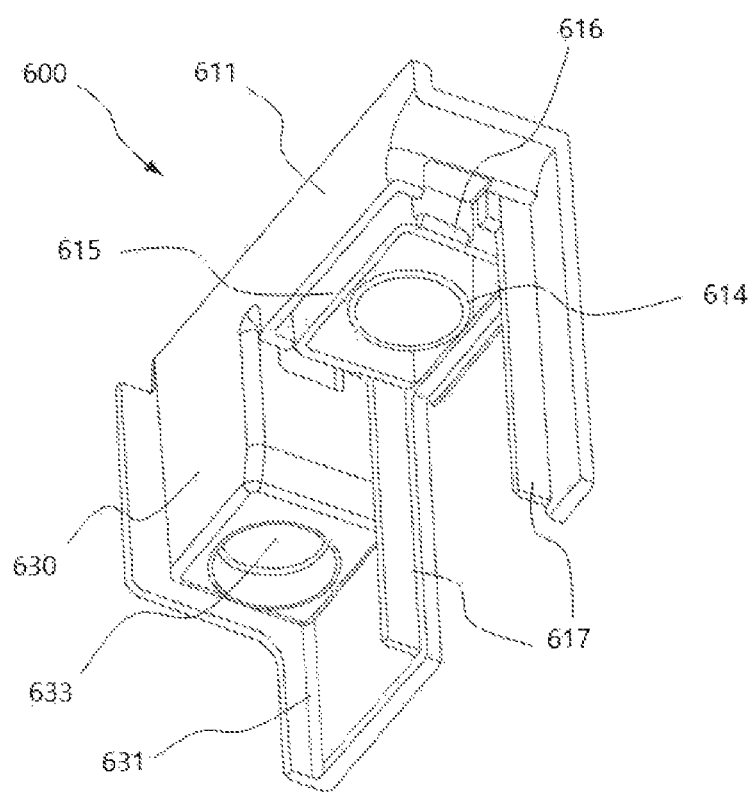
FIG. 7 is a rear bottom perspective view of the terminal block protective cover according to an embodiment of the present disclosure.

Referring to FIGS. 5, 7, and 9, a pair of coupling protrusions 617 extending downwardly from a front side surface of the outer shape portion are provided. Each coupling protrusion 617 is formed to be inserted into the coupling slot 412 formed on the front side surface of the shielding plate 410 when coupled to the insulating cover 400. That is, the terminal block protective cover 600 may be coupled simply through sliding through the configuration of the coupling slots 412 and the coupling protrusions 617.

The melting portion 613 includes a first melting portion 614 protruding from a portion opposite to the upper surface of the terminal block inside the outer shape portion 611, and a second melting portion 615 protruding from an inner upper surface of the outer shape portion 611 and in contact with an inner side surface of the shielding plates 410.

In addition to the shielding plates and the outer shape portion 611, the second melting portion 615 thirdly prevents the metal particles that may occur in a thermal runaway situation from being introduced into the terminal block 200. In addition, a detachable protrusion 616 in the form of a wide top and narrow bottom is outwardly formed on one side of a lower end of the second melting portion 615, and is inserted into the detachable hole 411 of the shielding plates 410 to prevent the terminal block protective cover 600 from being easily separated from the insulating cover 400.

Figure 10:
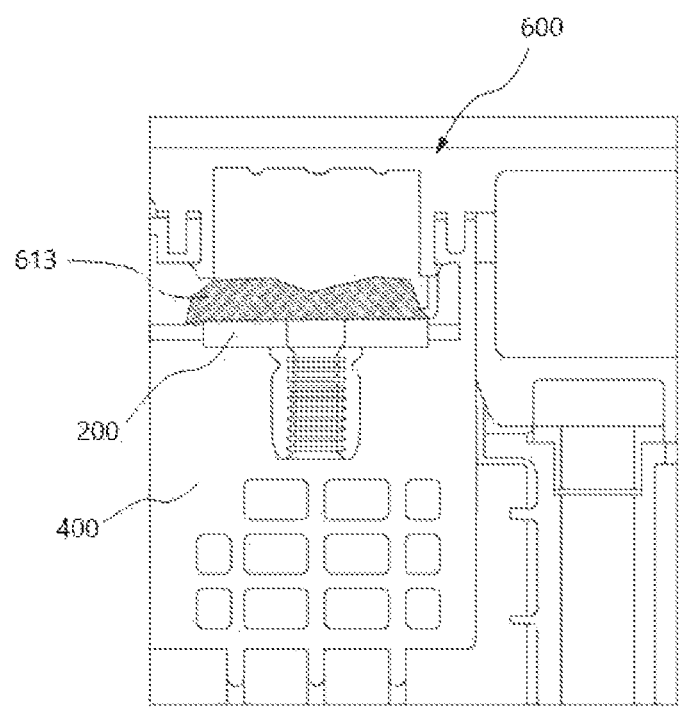
FIG. 10 is a cross-sectional view illustrating a state in which a melting portion is melted.

FIG. 10 illustrates a cross section of FIG. 9 in a state in which the melting portion is melted. As an example, the melting portion 613 is melted at a first temperature, and the outer shape portion 611 is melted at a second temperature that is higher than the first temperature. To this end, the melting portion 613 may be first melted by forming the outer shape portion 611 and the melting portion 613 of different materials, or forming a thickness of the melting portion 613 to be thinner than a thickness of the outer shape portion 611 even if the outer shape portion 611 and the melting portion 613 are formed of the same material. As described above, if the melting portion 613 is formed to be melted before the outer shape portion 611, the outer shape portion 611 in a situation of the first temperature allows the melted melting portion 613 to first insulate the upper surface of the terminal block 200 inside the outer shape portion 611 as illustrated in FIG. 10. This has an effect that even if the melted outer shape portion 611 flows to the outside of the shielding plates 410 and disappears at the time of melting the outer shape portion 611, the first melted melting portion 613 protects the terminal block 200 to prevent the metal particles from being in contact with the terminal block 200. Preferably, the melting portion 613 is appropriately set to have a melting point of about 160 degrees Celsius.

As described above, the bolt hole cover portion 630 is formed to extend from the terminal block protective portion 610 to cover the upper end of the bolt hole 520 located on the side closest to the terminal block 200. A bolt groove 633 capable of accommodating a head portion of the bolt inserted into the bolt hole 520 is formed in a portion of the lower surface of the bolt hole cover portion 630 opposite to the bolt hole 520. For stronger insulation, a plate-shaped extension 631 extending downward along a periphery of a lower end of the bolt hole cover portion 630 may be further formed around the lower end of the bolt hole cover portion 630.

The battery module including the terminal block protective cover for preventing the short circuit of the present disclosure having such a configuration may insulate the terminal block in a thermal runaway situation through the configuration of the terminal block protective cover.

In particular, in a high-temperature situation, the outer shape portion may effectively insulate the terminal block by limiting an accommodating position of the melting portion, which is melted before the outer shape portion and is in a liquid state, to the upper surface of the terminal block.

In addition, the assembly operation of the terminal block protective cover may be more easily performed through the configuration of the coupling protrusion and the coupling slot.

In addition, it is possible to reduce the problem that the metal particles generated in a thermal runaway situation are introduced into the terminal block, through the configuration of the shielding plate.

In addition, it is possible to prevent the terminal block protective cover from being easily detached from its original position through the configuration of the detachable protrusion and the detachable hole.

In addition, it is possible to insulate the bolt hole through the bolt hole cover portion and the bolt insulating member.

The present disclosure is not to be construed as being limited to the above-mentioned embodiment. The present disclosure may be applied to various fields and may be variously modified by those skilled in the art without departing from the scope of the present disclosure claimed in the claims. Therefore, these improvements and changes will fall within the scope of protection of the present disclosure as long as it is apparent to those skilled in the art.

Detailed Description of Main Elements

| | |
|---|---|
| 10: battery module | 20: bus bar |
| 100: bus bar frame | |
| 200: terminal block | |
| 300: housing | |
| 400: insulating cover | 410: shielding plates |
| 411: detachable hole | 412: coupling slot |
| 420: support | |
| 500: protective cover | 510: cut-out hole |
| 520: bolt hole | 521: bolt insulating member |
| 600: terminal block protective cover | 610: terminal block protective portion |
| 611: outer shape portion | 612: guide pin |
| 613: melting portion | |
| 614: first melting portion | 615: second melting portion |
| 616: detachable protrusion | 617: coupling protrusion |
| 630: bolt hole cover portion | |
| 631: extension | 633: bolt groove |

What is claimed is:

1. A battery module comprising:
a battery cell stack in which a plurality of battery cells are stacked;
a terminal block electrically connected to the battery cell stack;
a housing accommodating the battery cell stack;
an insulating cover covering an opening of the housing and having a terminal block through hole exposing the terminal block to an outside of the housing and being formed on one side of the insulating cover; and a terminal block protective cover accommodating the terminal block exposed to the outside of the housing, a melting portion of the terminal block protective cover being melted at a predetermined temperature and insulating the terminal block exposed to the outside of the housing by covering the terminal block, wherein, a material of the terminal block protective cover is selected from at least one of ethylene propylene diene monomer (EPDM), mica, glass tape, glass wool, aerogel, urethane, or thermo plastic elastomer (TPE), wherein the insulating cover further comprises a pair of shielding plates formed on both sides of the terminal block through hole, wherein the terminal block is exposed through the terminal block through hole, wherein, in a section between the shielding plates, a support formed parallel to the terminal block is further formed below the terminal block to connect the pair of shielding plates, and wherein the support is formed to be in contact with a lower surface of the terminal block.

2. The battery module of claim 1, wherein the terminal block protective cover comprises a coupling protrusion extending in one direction, a coupling slot is formed in the insulating cover, and the coupling protrusion is coupled to the coupling slot by sliding on the coupling slot.

3. The battery module of claim 1, wherein the melting portion of the terminal block protective cover is accommodated in the shielding plates and the terminal block protective cover further comprising a detachable protrusion protruding outwardly from one side of the melting portion, and the shielding plates further comprising a hole into which the detachable protrusion is inserted.

4. The battery module of claim 1, wherein the terminal block protective cover comprises an outer shape portion accommodating the terminal block, and the melting portion protruding from a surface of the outer shape portion opposite to an upper surface of the terminal block, and the melting portion is melted at a certain temperature or higher to cover and insulate the outer surface of the terminal block.

5. The battery module of claim 4, wherein the melting portion is melted at a first temperature which is the certain temperature, and the outer shape portion is melted at a second temperature, which is higher than the first temperature.

6. The battery module of claim 5, wherein the outer shape portion and the melting portion are made of different materials.

7. The battery module of claim 4, wherein a thickness of the melting portion is thinner than a thickness of the outer shape portion.

8. The battery module of claim 1, further comprising a protective cover coupled to the outside of the insulating cover, the protective cover being formed with a cut-out hole to expose the terminal block to the outside through the cut-out hole for coupling and being formed with a bolt hole for inserting a bolt for coupling with the insulating cover, and the terminal block protective cover comprises:
a terminal block protective portion accommodating the terminal block, and
a bolt hole cover portion extending from the terminal block protective portion and covering an upper end of the bolt hole.

9. The battery module of claim 8, wherein a bolt insulating member inserted into the bolt hole, made of an insulating material, and surrounding an outer periphery of the bolt inserted into the bolt hole is inserted into the protective cover.

10. A battery pack comprising:
a plurality of battery modules of claim 1; and
a bus bar electrically connecting the battery modules by connecting to terminal blocks of the battery modules.

* * * * *